United States Patent
Yoshihara et al.

(10) Patent No.: US 7,159,546 B2
(45) Date of Patent: Jan. 9, 2007

(54) CONTROL APPARATUS FOR INTERNAL COMBUSTION ENGINE

(75) Inventors: Masatomo Yoshihara, Toyota (JP); Hirohiko Yamada, Okazaki (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/360,806

(22) Filed: Feb. 24, 2006

(65) Prior Publication Data
US 2006/0191512 A1    Aug. 31, 2006

(30) Foreign Application Priority Data
Feb. 28, 2005    (JP)    ............... 2005-055116

(51) Int. Cl.
  F02D 9/02    (2006.01)
  F02D 11/10   (2006.01)
(52) U.S. Cl. .................... 123/90.15; 123/399
(58) Field of Classification Search .. 123/90.15–90.18, 123/399
See application file for complete search history.

(56) References Cited

U.S. PATENT DOCUMENTS

| | | | |
|---|---|---|---|
| 5,690,071 A * | 11/1997 | Jankovic | 123/436 |
| 6,000,375 A * | 12/1999 | Isobe | 123/399 |
| 6,502,546 B1 * | 1/2003 | Kawasaki et al. | 123/90.15 |
| 6,626,144 B1 * | 9/2003 | Kanamaru | 123/399 |
| 6,843,226 B1 * | 1/2005 | Miura | 123/399 |
| 6,866,020 B1 * | 3/2005 | Allston et al. | 123/399 |
| 2002/0174850 A1 * | 11/2002 | Kanai | 123/90.15 |

FOREIGN PATENT DOCUMENTS

JP    A-2001-263015    9/2001

* cited by examiner

*Primary Examiner*—Erick Solis
(74) *Attorney, Agent, or Firm*—Oliff & Berridge, PLC (57) ABSTRACT

An engine adjusts the amount of intake air by cooperative control for the valve duration of the intake valve and the opening degree of the throttle valve. In the engine, the valve duration is fixed to a warm-up valve duration θw in a low-to-middle speed range of the engine during a period from immediately after starting of the engine to when warm-up is completed. In a high speed range, on the other hand, the valve duration is increased from the warm-up valve duration θw in accordance with increase in the engine speed Ne.

7 Claims, 8 Drawing Sheets

CONTROL APPARATUS FOR INTERNAL COMBUSTION ENGINE

BACKGROUND OF THE INVENTION

The present invention relates to a control apparatus for an internal combustion engine, the engine having a variable valve duration mechanism that changes the valve duration of an intake valve, and performs cooperative control for the intake valve duration and the opening degree of a throttle valve, thereby adjusting the intake air amount.

Conventionally, to accelerate the warm-up after starting an engine, several measures have been taken. Such measures include setting a high idling speed and retarding the ignition timing for increasing the amount of heat used for the warm-up.

Also, a system including a variable valve duration mechanism has been applied to internal combustion engines. In such a system, the variable valve duration mechanism changes the valve duration of the intake valves (see Japanese Laid-Open Patent Publication No. 2001-263015). In an internal combustion engine having the system, the amount of air drawn into the combustion chambers can be decreased by reducing the valve duration of the intake valves. In this case, for example, pumping loss is reduced by a greater degree by reducing the opening degree of the throttle valve than by reducing the intake air amount. That is, loss of the power of the internal combustion engine is reduced. Accordingly, the fuel economy is improved.

SUMMARY OF THE INVENTION

Accordingly, it is an objective of the present invention to provide a control apparatus for an internal combustion engine, which apparatus is capable of further efficiently performing the warm-up of the engine having a variable valve duration mechanism.

To achieve the foregoing objectives, the first aspect of the present invention provides a control apparatus for an internal combustion engine, the engine having a variable valve duration mechanism that changes a valve duration of an intake valve and a throttle valve for changing a flow rate of air supplied to the engine. The engine performs cooperative control for the valve duration of the intake valve and an opening degree of the throttle valve, thereby adjusting the intake air amount. During a period from immediately after starting of the engine to when warm-up is completed, the valve duration is fixed to a predetermined warm-up valve duration in a low-to-middle speed range of the engine, and the valve duration is increased from the warm-up valve duration in accordance with increase in the engine speed in a high speed range of the engine.

The second aspect of the present invention provides a control apparatus for an internal combustion engine, the engine having a variable valve duration mechanism that changes a valve duration of an intake valve and a throttle valve for changing a flow rate of air supplied to the engine. The engine performs cooperative control for the valve duration of the intake valve and an opening degree of the throttle valve, thereby adjusting the intake air amount. During a period from immediately after starting of the engine to when warm-up is completed, the valve duration is fixed to a predetermined warm-up valve duration in a low-to-middle load range of the engine, and the valve duration is increased from the warm-up valve duration in accordance with increase in the engine load in a high load range of the engine.

The third aspect of the present invention provides a control apparatus for an internal combustion engine, the engine having a variable valve duration mechanism that changes a valve duration of an intake valve and a throttle valve for changing a flow rate of air supplied to the engine. The engine performs cooperative control for the valve duration of the intake valve and an opening degree of the throttle valve, thereby adjusting the intake air amount. During a period from immediately after starting of the engine to when warm-up is completed, the valve duration is fixed to a predetermined warm-up valve duration on the condition that a requested intake air amount is equal to or less than a predetermined air amount, and the valve duration is increased from the warm-up valve duration in accordance with increase in the intake air amount on the condition that the requested intake air amount is greater than the predetermined air amount.

According to these aspects of the invention, in the configuration where the intake air amount is adjusted through the cooperative control, to take in the same intake air amount, the combination of a small value of the valve duration and a great value of the throttle opening degree reduces pumping loss by a greater degree than the combination of a great value of the valve duration and a small value of the throttle opening degree. That is, the former combination requires less intake air amount and less fuel amount for generating the same engine power compared to the latter combination. In other words, to efficiently perform the warm-up while maintaining a sufficient engine power to continue the idling of the engine during a period from immediately after starting of the engine to when warm-up is completed, it is preferable that the warm-up be performed in a state of the combination of a large value of the valve duration and a small value of the throttle opening degree, in which the intake air amount and the fuel amount are large and the pumping loss is large. However, since the amount of exhaust gas increases in this case, the emission performance could deteriorate. Therefore, to accelerate the warm-up to the utmost while improving the emission performance, the valve duration of the intake valve is preferably set to a warm-up valve duration, which is suitable for striking a balance between the reduction of the exhaust gas amount and the generation of the heat amount for the warm-up, rather than simply maximizing the valve duration.

In each of the above aspects, during a period from immediately after starting of the engine to when warm-up is completed, the valve duration is fixed to the warm-up valve duration in the low-to-middle speed range, in the low-to-middle load range, or in a state where the request intake air amount of the engine is equal to or less than the predetermined air amount. Thus, the warm-up is efficiently accelerated to the utmost while improving the emission performance.

While the valve duration is fixed to the warm-up valve duration, the engine can be requested to operate at a high speed or a high load. In other cases, while the valve duration is fixed to the warm-up valve duration, an intake air amount greater than the predetermined air amount can be requested, for example, for acceleration. In such cases, even if the throttle valve is opened to the maximum degree, the requests could be unsatisfied, for example, due to shortage of the intake air amount. In each of the above described aspects, when such requests are made, the valve duration is increased from the warm-up valve duration in accordance with increase in the engine speed, the engine load, or the request intake air amount. Thus, the requests are readily satisfied.

Therefore, according to the above described aspects, the warm-up is efficiently accelerated to the utmost while flexibly responding to such a request for high speed range operation.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 9.

Figure 1:
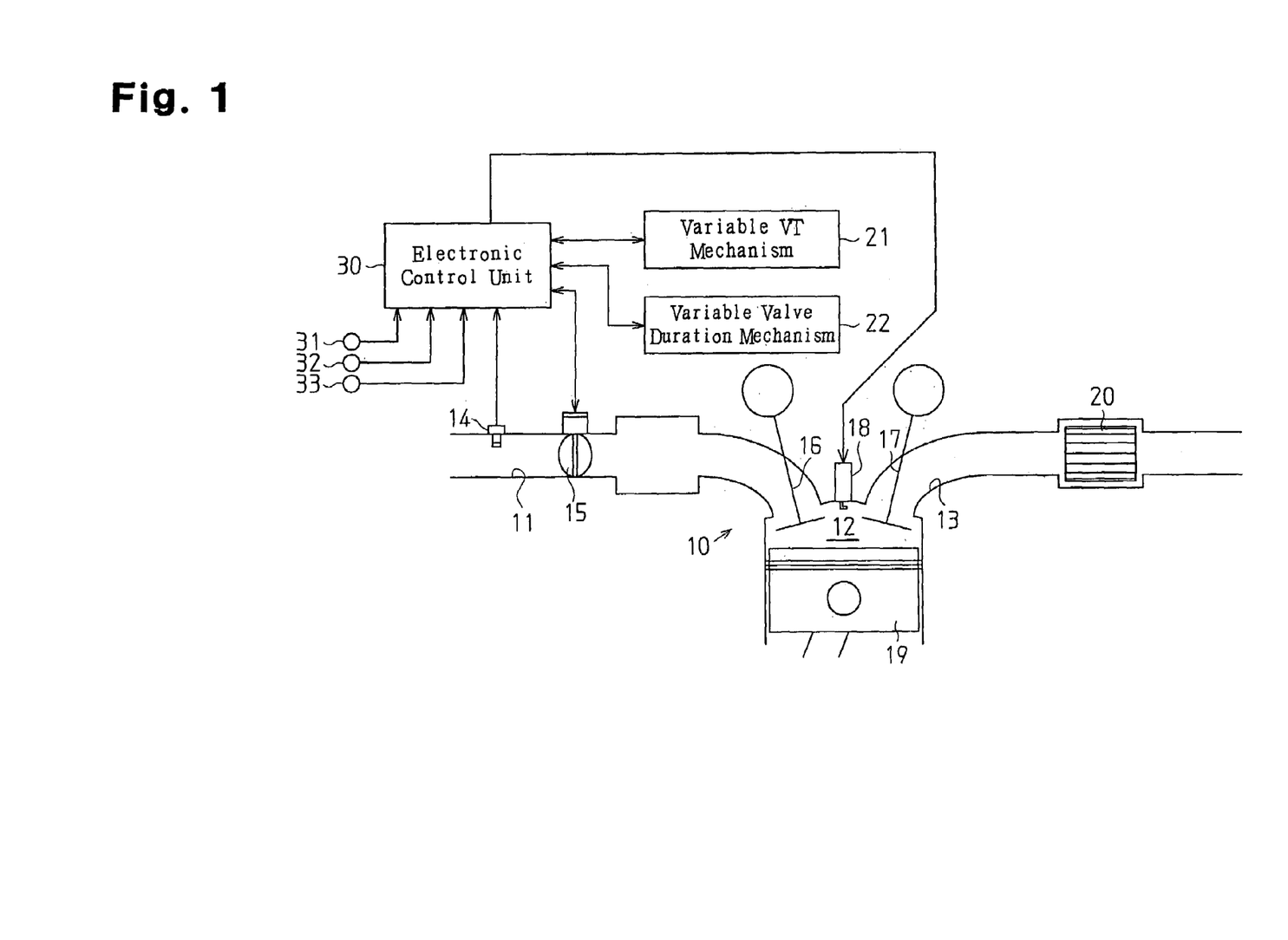
FIG. 1 is a schematic diagram illustrating a control system of an engine according to one embodiment of the present invention.

FIG. 1 shows a schematic configuration of a vehicle engine (internal combustion engine) 10 according to the preferred embodiment. As shown in FIG. 1, the engine 10 includes an intake passage 11, a combustion chamber 12, and an exhaust passage 13.

The intake passage 11 of the engine 10 is provided with an air flow meter 14, which detects the air flow rate inside the intake passage 11, and a throttle valve 15, which changes the flow passage area inside the intake passage 11 to change the amount of the intake air. The intake passage 11 is connected to the combustion chamber 12 via an intake valve 16. The combustion chamber 12 is connected to the exhaust passage 13 via an exhaust valve 17. The intake valve 16 and the exhaust valve 17 are driven in accordance with the rotation of the engine 10, and selectively open and close the intake passage 11 and the exhaust passage 13 with respect to the combustion chamber 12.

Air is drawn into the combustion chamber 12 through the intake passage 11. The air and fuel injected from a fuel injection valve, which is not shown, form an air-fuel mixture. When the air-fuel mixture is ignited by an ignition plug 18, which is also not shown, the air-fuel mixture is burned. This causes a piston 19 to reciprocate, thereby rotating an engine output shaft, which is a crankshaft. The burned air-fuel mixture is then sent from the combustion chamber 12 to the exhaust passage 13 as exhaust gas. An exhaust purification catalyst 20, which is a three-way catalyst, is provided in the exhaust passage 13 to purify the exhaust gas from the combustion chamber 12.

Figure 2A:
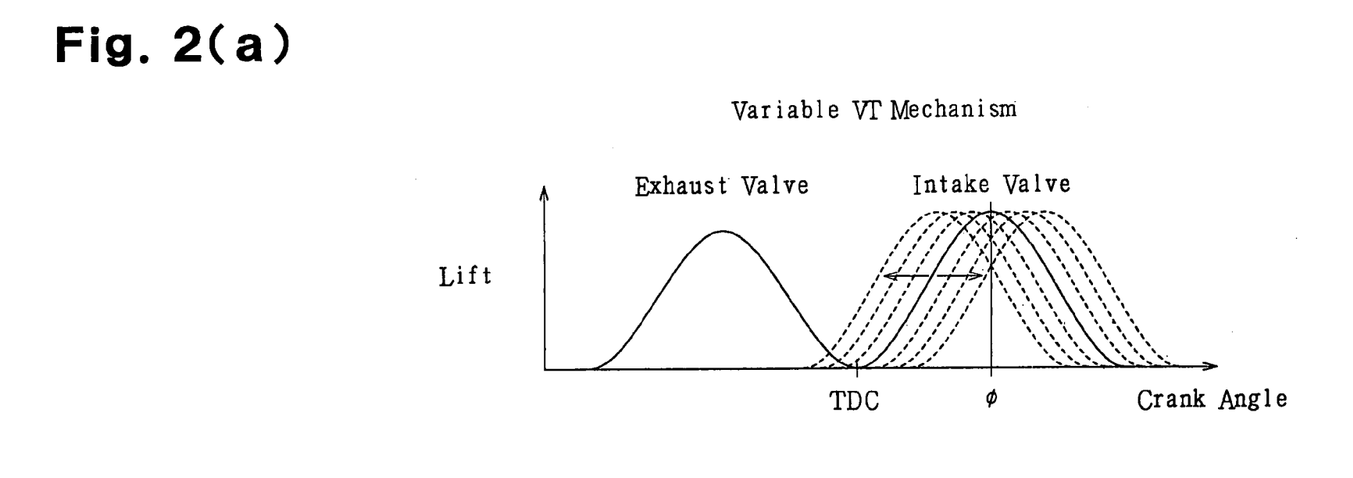
FIG. 2(a) is a diagram illustrating valve actuation changed by a variable VT mechanism.

A valve actuation system for the intake valve 16 of the engine 10 includes a variable valve timing mechanism (variable VT mechanism) 21 and a variable valve duration mechanism 22. The variable valve timing mechanism 21 is configured to continuously change a valve duration center $\phi$ of the intake valve 16, or the center $\phi$ of the angle of a cam actuating the intake valve 16, as shown in FIG. 2 (a). The engine 10 employs, as the variable valve timing mechanism 21, a mechanism that changes the relative rotational phase of the camshaft with respect to the crankshaft to change the valve duration center $\phi$.

Figure 2B:
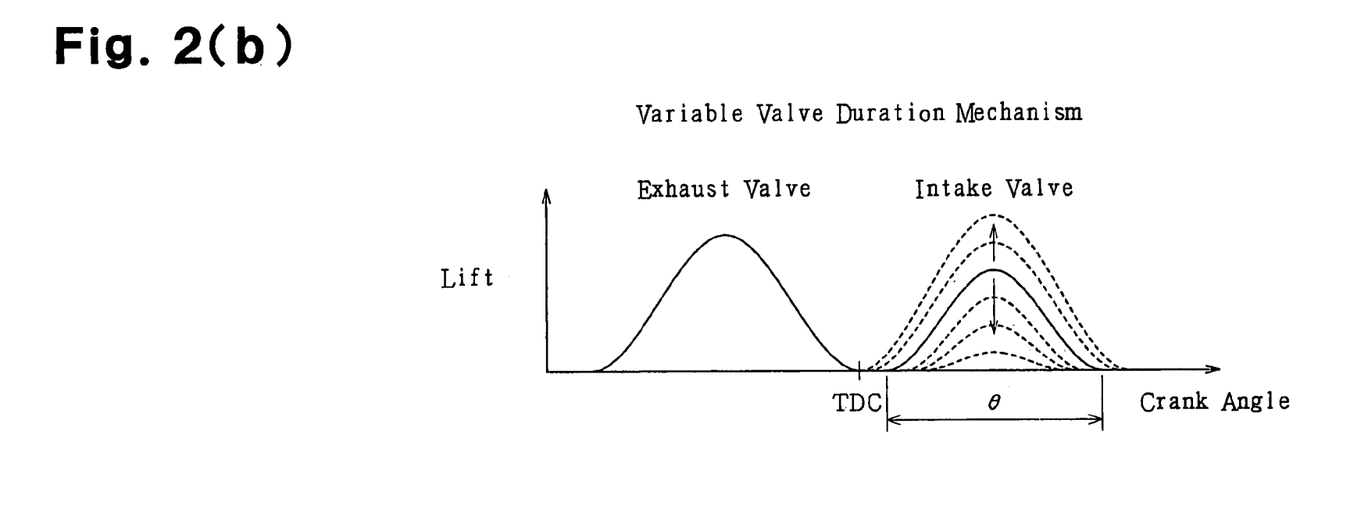
FIG. 2(b) is a diagram illustrating valve actuation changed by a variable valve duration mechanism.

The variable valve duration mechanism 22 continuously changes the duration $\theta$ of the intake valve 16 as shown in FIG. 2 (b). The variable valve duration mechanism 22 increases or reduces the maximum valve lift of the intake valve 16 in accordance with increase or decrease in the valve duration $\theta$.

The variable valve timing mechanism 21 is operated hydraulically. The hydraulic power is supplied from an oil pump that is driven by rotation of the crankshaft of the engine 10.

The variable valve duration mechanism 22 is not operated hydraulically, but is operated electromagnetically. That is, the variable valve duration mechanism 22 is driven by an electromagnetic actuator comprising an electric motor or an electromagnetic solenoid.

Various types of controls such as a fuel injection control and an ignition timing control of the engine 10 are performed by an electronic control unit 30. The electronic control unit 30 includes a central processing unit (CPU), which executes various types of computation processes related to control of the engine 10, a read only memory (ROM), which stores programs and data for the control, a random access memory, which stores the computation results of the CPU and data input from sensors, and input/output ports, which communicate signals with external devices.

The input port of the electronic control unit 30 is connected to, in addition to the air flow meter 14, a throttle sensor of the throttle valve 15, a VT sensor of the variable valve timing mechanism 21, and a valve duration sensor of the variable valve duration mechanism 22. The throttle sensor detects the opening degree (throttle opening degree) Ta of the throttle valve 15. The VT sensor detects the current valve duration center $\phi$ of the intake valve 16. The valve duration sensor detects the current valve duration $\theta$ of the intake valve 16.

Furthermore, the input port is connected to an accelerator pedal position sensor 31, a crank angle sensor 32, and a coolant temperature sensor 33. The accelerator pedal sensor 52 detects the degree of depression of an accelerator pedal. The crank angle sensor 32 detects the rotation speed of the crankshaft, that is, the engine speed Ne. The coolant temperature sensor 33 detects the temperature of the coolant of the engine 10 (engine coolant temperature). In addition, the input port is connected to various types of sensors for detecting the operating condition of the engine 10 and the running condition of the vehicle.

The output port of the electronic control unit 30 is connected to various types of actuators used for controlling the engine 10 such as the throttle valve 15, the ignition plug 18, the variable valve timing mechanism 21, and the variable valve duration mechanism 22. The electronic control unit 30 performs various types of controls of the engine 10 by controlling the actuators based on the detection results from the various types of sensors.

For example, the valve performance of the intake valve 16, such as the valve duration center φ and the valve duration θ, is controlled in the manner described below. That is, the electronic control unit 30 first computes target values of the valve duration center φ and the valve duration θ of the intake valve 16 suitable for the engine operating state based on the depression degree of the accelerator pedal and the engine speed Ne detected by the accelerator pedal position sensor 31 and the crank angle sensor 32. Then, the electronic control unit 30 performs feedback control of the variable valve timing mechanism 21 and the variable valve duration mechanism 22 such that the current valve duration center φ and the valve duration θ of the intake valve 16 detected by the VT sensor and the valve duration sensor become equal to the computed target values, respectively. This makes it possible to obtain optimum valve actuation of the intake valve 16 according to the current operating state of the engine 10.

If the valve duration θ of the intake valve 16 is changed by the variable valve duration mechanism 22, the volume of air introduced into the combustion chamber 12 (intake air amount) is changed as well. To deal with this situation, the electronic control unit 30 controls the opening degree of the throttle valve 15 along with control of the valve duration θ. This set of control is referred to as cooperative control of the valve duration θ and a throttle opening degree Ta. This guarantees that a required intake air amount is drawn into the engine 10 regardless of changes made by the variable valve duration mechanism 22 to the valve duration θ of the intake valve 16.

When the engine 10 is being started or when the engine 10 is being warmed up (period from the point immediately after the engine start to the completion of the warm-up), the valve duration θ and the valve duration center φ are adjusted to be suitable for each period. That is, the valve duration θ and the valve duration center φ are adjusted to be suitable for starting the engine 10 when the engine 10 is being started, and adjusted to be suitable for the warm-up when the engine is being warmed up. During the engine starting or the warm-up, the opening degree of the throttle valve 15 is controlled to take in a required intake air amount with the valve duration θ and the valve duration center φ being adjusted in the above described manner.

When the engine 10 is being started, the valve duration center φ is adjusted to a value that sets the valve timing of the intake valve 16 to the most retarded state (hereinafter, the value is referred to as an engine starting valve duration center φs). The valve duration θ is adjusted to a value that is optimal for starting the engine 10 with the valve duration center φ set to the engine starting valve duration center φs (this value of the valve duration θ is hereafter referred to as an engine starting valve duration θs).

During the warm-up, the valve duration θ and the valve duration center φ are each adjusted to an optimum value of the warm-up. Hereinafter, the value of the valve duration θ optimal for the warm-up is referred to as a warm-up valve duration θw, and the value of the valve duration center φ optimal for the warm-up is referred to as a warm-up valve duration center φw.

That is, in the configuration where the intake air amount is adjusted through the cooperative control, to take in the same intake air amount, the combination of a small value of the valve duration θ and a great value of the throttle opening degree Ta reduces pumping loss by a greater degree than the combination of a great value of the valve duration θ and a small value of the throttle opening degree Ta. That is, the former combination requires less intake air amount and less fuel amount for generating the same engine power compared to the latter combination. In other words, to efficiently perform the warm-up while maintaining a sufficient engine power to continue the idling of the engine, it is preferable that the warm-up be performed in a state of the combination of a large value of the valve duration θ and a small value of the throttle opening degree Ta, in which the intake air amount and the fuel amount are large and the pumping loss is large.

However, since the amount of exhaust gas increases in this case, the emission performance could deteriorate. Therefore, to accelerate the warm-up to the utmost while improving the emission performance, the valve duration θ is preferably set to a value suitable for striking a balance between the reduction of the exhaust gas amount and the generation of the heat amount for the warm-up, rather than simply maximizing the valve duration θ. In this embodiment, the warm-up valve duration θw is used as an optimal value for striking a balance between the reduction of the exhaust gas amount and the generation of the heat amount during the warm-up. The warm-up valve duration θw is less than the maximum valve duration θmax in the control of the valve duration θ performed by the electronic control unit 30.

In this embodiment, when the engine 10 is operating in a low-to-medium speed range during the warm-up, the valve duration θ is adjusted (fixed) to the warm-up valve duration θw, which improves the emission performance and accelerates the warm-up. However, while the valve duration θ is fixed to the warm-up valve duration θw, the engine 10 can be requested to operate at a high speed. In such a case, even if the throttle valve 15 is opened to the maximum degree, the request could be unsatisfied due to shortage of the intake air amount.

Accordingly, in this embodiment, to avoid such a problem, when there-is such a request, the valve duration θ is increased from the warm-up valve duration θw in accordance with the engine speed Ne.

The control procedures related to control of the valve duration θ will now be described with reference to the flowcharts of FIGS. 3 to 6. The control routines shown in the flowcharts are executed as interrupts by the electronic control unit 30, for example, at predetermined time intervals.

First, the control routine shown in FIG. 3 will be described.

The electronic control unit 30 starts the control routine by determining whether there has been a request for starting the engine 10 (step S110). The determination is done based on whether the ignition switch (IG switch) has been switched from OFF to ON. That is, if there has been the switch, it is determined that there has been a starting request. If not, it is determined that there has been no starting request. When it is determined that there has been no starting request (NO at step S110), the process in this routine is temporarily suspended.

On the other hand, when it is determined that there has been a starting request (YES at step S110), the electronic control unit 30 proceeds to step S120, and sets a target value of the valve duration θ (the target valve duration θt) to the engine starting valve duration θs. The engine starting valve duration θs is greater than the minimum valve duration θmin in the control of the valve duration θ by the electronic control unit 30.

When stopping the engine 10 in this embodiment, the target valve duration θt is set to the maximum valve duration θmax, and a target value of the valve duration center φ (a target valve duration center φt) is set to the engine starting valve duration center φs. That is, initial values of the valve duration θ and the valve duration center φ immediately before starting the engine 10 are set to the maximum valve duration θmax and the engine starting valve duration center φs, respectively.

Therefore, at step S120, the target valve duration center φt is maintained at the engine starting valve duration center φs (that is, the target valve timing of the intake valve 16 is maintained at the most retarded valve timing). In this state, the target valve duration θt is changed to the engine starting valve duration θs optimal for starting the engine in this state.

Through step S130, the variable valve actuation mechanisms 21, 22 are controlled such that the current valve duration center φ and the current valve duration θ become equal to the target valve duration center φt and the target valve duration θt, respectively. This optimizes the valve duration center φ and the valve duration θ for starting the engine 10.

At step S140, the electronic control unit 30 determines whether the starting of the engine 10 has been completed. The determination is performed based on whether the engine speed Ne is greater than a predetermined reference speed that is greater than the speed of the engine starter motor used for cranking. That is, the starting of the engine 10 is determined to have been completed when the detection value of the engine speed Ne obtained through the crank angle sensor 32 surpasses the reference speed. This determination is continued until the starting is determined to have been completed.

If the starting is determined to have been completed at step S140 (YES at S140), the electronic control unit 30 proceeds to step S150. At step S150, the electronic control unit 30 determines whether the warm-up has been completed. The determination is performed based on whether the detection value of the-engine coolant temperature obtained through the coolant temperature sensor 33 is greater than a predetermined value. That is, the warm-up is determined to have been completed when the detection value surpasses the predetermined value. When the warm-up is determined to have been completed (YES at step S150), the normal control of the valve duration center φ and the valve duration θ for a state after the completion of the warm-up is performed. That is, a process for striking a balance between the amount of generated heat and the emission performance (warm-up process) is not executed.

On the other hand, if the warm-up is determined not to have been completed at step S150, (NO at step S150), the electronic control unit 30 executes the warm-up process at step S160. The warm-up process is continued until the warm-up is determined to have been completed.

Figure 4:
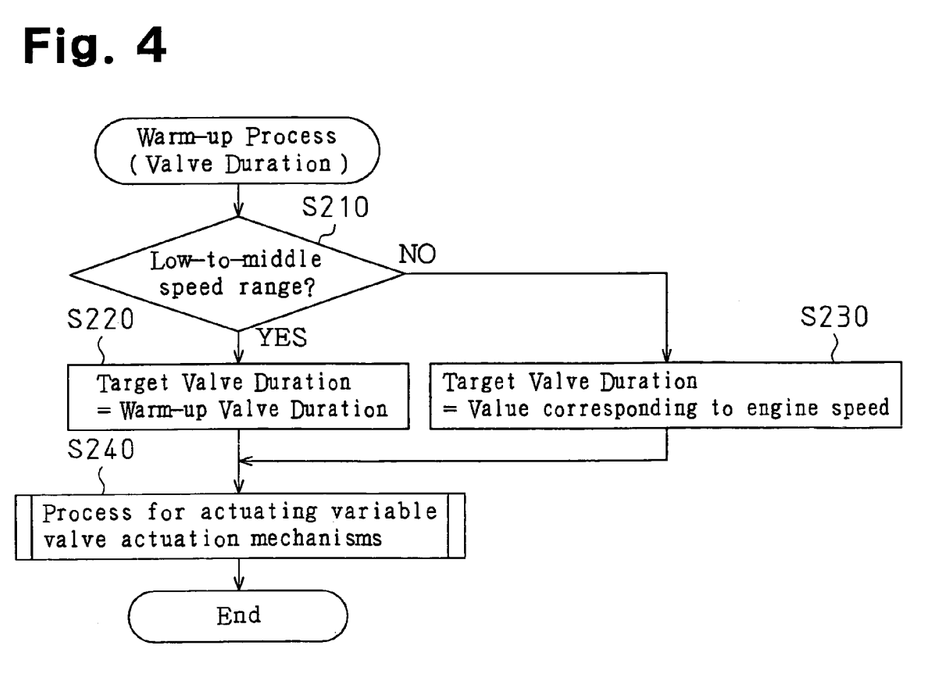
FIG. 4 is a flowchart showing a warm-up process related to valve duration.
Figure 5:
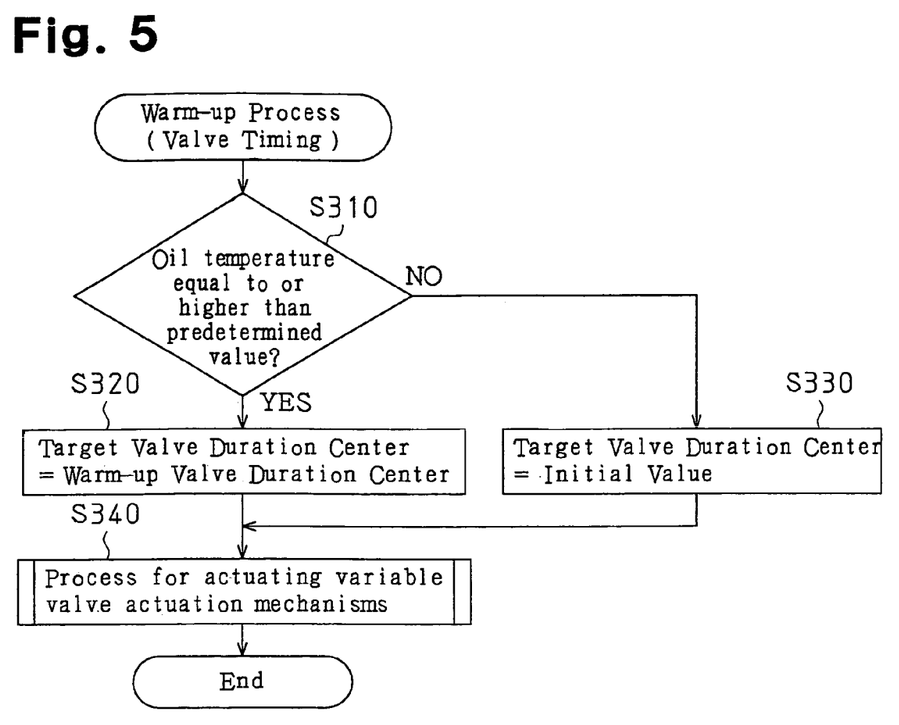
FIG. 5 is a flowchart showing a warm-up process related to valve timing.

The control routines shown in FIGS. 4 and 5 represents procedures for the valve duration θ and the valve duration center φ in the warm-up process.

First, the control routine of FIG. 4 related to the warm-up process of the valve duration θ will be described.

In this control routine, the electronic control unit 30 first determines whether the engine is operating in a low-to-middle speed range at step S210. This determination is performed based on the detection value of the engine speed Ne obtained through the crank angle sensor 32. When it is determined that the engine 10 is operating in the low-to-middle speed range (YES at step S210), the electronic control unit 30 proceeds to step S220, and sets the target valve duration θt to the warm-up valve duration θw.

On the other hand, when the determination result at step S210 is NO, the engine 10 is determined to be operating in the high speed range, and the electronic control unit 30 proceeds to step S230. At step S230, the electronic control unit 30 sets the target valve duration θt to a value that enables an increased amount of intake air to be taken in. That is, the valve duration θ is set to the target valve duration θt, which is greater than the warm-up valve duration θw.

In this setting process, the target valve duration θt is set to a value that corresponds to the engine speed Ne at the time (hereinafter referred to as an engine speed corresponding value). In this embodiment, the engine speed corresponding value is set higher as the engine speed Ne increases, and the maximum value is the maximum valve duration θmax.

Figure 7:
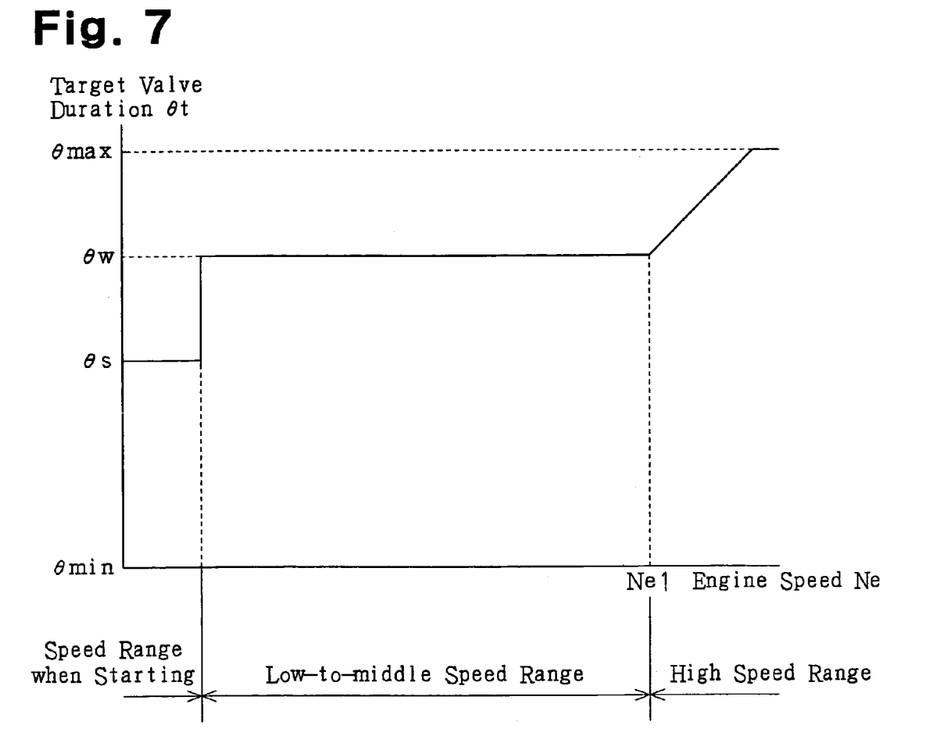
FIG. 7 is a diagram for explaining the configuration of a control map showing the relationship between the engine speed and a target valve duration.

FIG. 7 is a diagram showing the relationship between the engine speed Ne and the target valve duration θt, which is set in the above described manner. A control map based on the relationship is stored in the ROM in advance.

As shown in FIG. 7, the target valve duration θt is fixed to the warm-up valve duration θw in the low-to-middle speed range. In the high speed range, as the engine speed Ne increases from an engine speed that is a threshold value between the low-to-middle speed range and the high speed range (a threshold speed Ne1), the target valve duration θt is increased (with the maximum valve duration θmax being the upper limit). After the target valve duration θt reaches the maximum valve duration θmax, the target valve duration θt is maintained to and does not exceed the maximum valve duration θmax even if the engine speed Ne further increases.

At step S240, the electronic control unit 30 controls the variable valve duration mechanism 22 such that the current valve duration θ becomes equal to the target valve duration θt. Therefore, when the engine 10 is operating in the low-to-medium speed range during the warm-up, the valve duration θ is fixed to the warm-up valve duration θw. This efficiently accelerates the warm-up while improving the emission performance. On the other hand, when the engine 10 is requested to operate in the high speed range, the valve duration θ is increased from the warm-up valve duration θw as the engine speed Ne increases. Accordingly, the request is readily satisfied by increasing the intake air amount.

Next, the control routine of FIG. 5 related to the valve duration center φ, or the valve timing of the intake valve 16, will be described.

In this control routine, the electronic control unit 30 first determines whether the temperature of oil for actuating the variable valve timing mechanism 21 is greater than or equal to a predetermined value at step S310. The determination is performed by referring to the detection value of the engine coolant temperature based on the coolant temperature sensor 33. If the oil temperature is determined to be equal to or greater than the predetermined value (YES at step 310), the viscosity of the oil is determined to have been lowered to such a level that the variable valve timing mechanism 21 can be actuated with a certain controllability. In this case, the electronic control unit 30 proceeds to step S320. At step S320, the electronic control unit 30 sets the target valve duration center φt to the warm-up valve duration center φw. The warm-up valve duration center φw is a value of the valve duration center φ that is optimal for the warm-up in a state where the target valve duration θt is set to the warm-up valve duration θw. The warm-up valve duration center φw is less than the maximum value φmax in the control of the valve duration center φ. That is, the warm-up valve duration center φw is less than a value corresponding to the most advanced valve timing).

On the other hand, when the determination result of step S310 is NO, the oil temperature is less than the predetermined value, and the viscosity of the oil is so high a value that it is not suitable for actuating the variable valve timing mechanism 21. In this case, the electronic control unit 30 proceeds to step S330, and sets the target valve duration center φt to the initial value. In this embodiment, the initial value is the engine starting valve duration center φs, which corresponds to the most retarded valve timing of the intake valve 16.

At step S340, the electronic control unit 30 controls the variable valve timing mechanism 21 such that the current valve duration center φ becomes equal to the target valve duration center φt. Thus, during the warm-up, if the oil temperature is equal to or greater than the predetermined value, the current valve duration center φ is fixed to the warm-up valve duration center φw.

Even in a state like the warm-up where the oil for actuating the variable valve timing mechanism 21 has a low temperature and a high viscosity and the controllability of the mechanism 21 is lowered, fixing the valve timing of the intake valve 16 to a constant value (the warm-up valve timing) as in this embodiment allows the mechanism 21 to be relatively accurately controlled. Therefore, by setting in advance the warm-up valve timing to a timing that maintains a favorable emission performance as in the present embodiment, the emission performance is maintained to a favorable level to the utmost even in a state where the controllability is lowered as described above.

In this embodiment, the valve duration θ is fixed to the warm-up valve duration θw while the engine 10 operating in the low-to-middle speed range. Therefore, the warm-up valve timing is easily set to a value for maintaining the emission performance.

Figure 6:
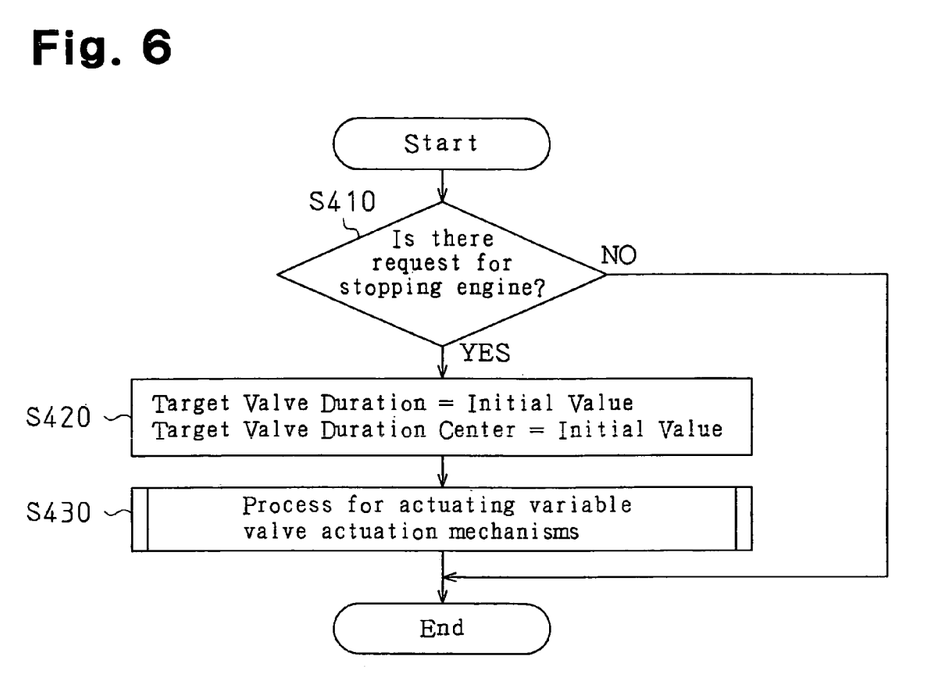
FIG. 6 is a flowchart showing a process related to valve duration and valve timing when stopping the engine.

The control routine of FIG. 6 relates to control of the valve duration θ and the valve duration center φ when the engine 10 is not operating.

The electronic control unit 30 starts the control routine by determining whether there has been a request for stopping the engine 10 (step S410). The determination is done based on whether the IG switch has been switched from ON to OFF. That is, if there has been the switch, it is determined that there has been a stopping request. If not, it is determined that there has been no stopping request. When it is determined that there has been no stopping request (NO at step S410), the process in this routine is temporarily suspended.

On the other hand, when it is determined that there has been a stopping request (YES at step S410), the electronic control unit 30 proceeds to step S420, and sets the target valve duration θt and the target valve duration center φt to the initial values. That is, the target valve duration θt is set to the maximum valve duration θmax, and the target valve duration center φt is set to the engine starting valve duration center φs.

The electronic control unit 30 then controls the variable valve actuation mechanisms 21, 22 such that the current valve duration θ and the current valve duration center φ become equal to the target valve duration θt and the target valve duration center φt.

Figure 3:
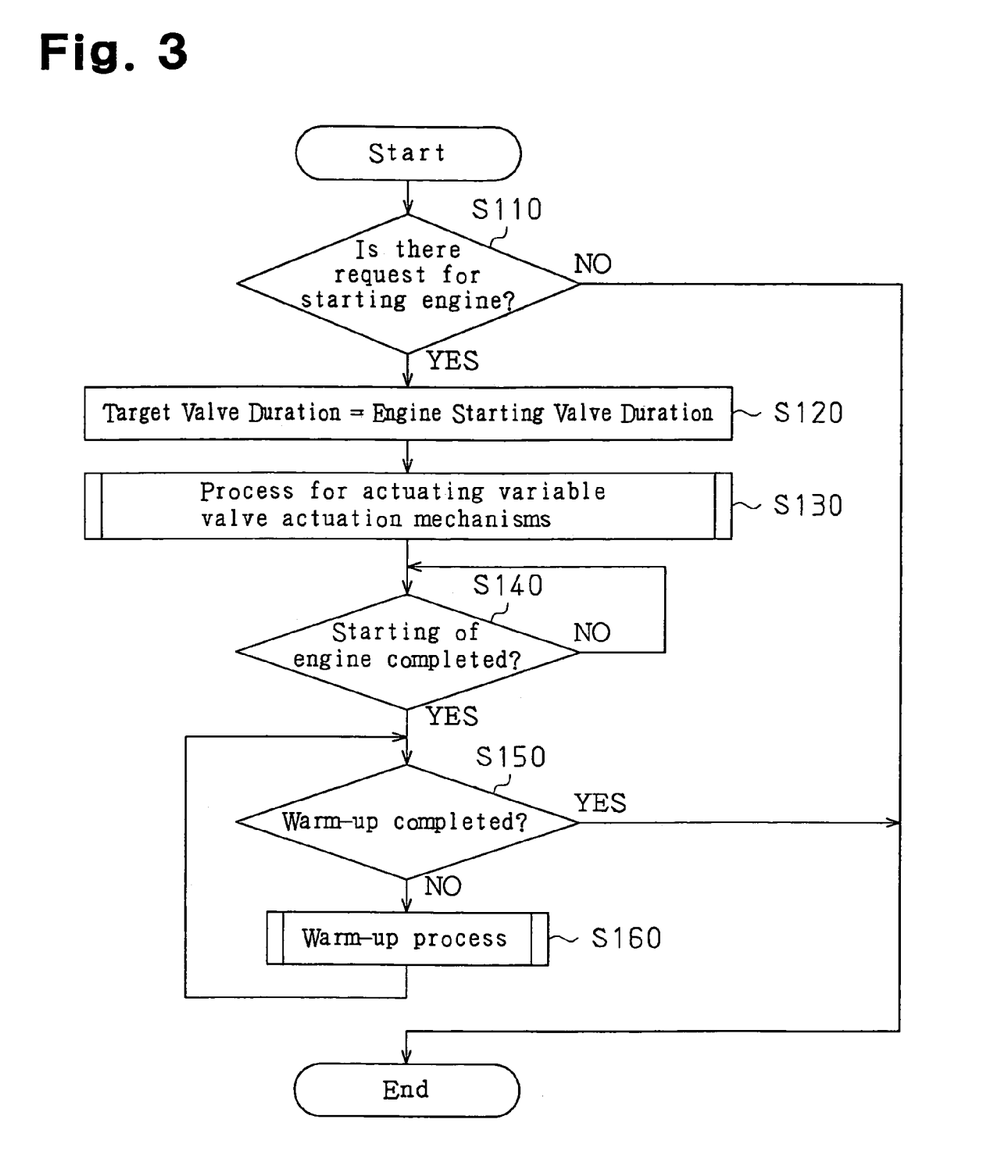
FIG. 3 is a flowchart showing a control routine for determining whether a condition for starting a warm-up process is met.

In this embodiment, when the determination result at step S410 is YES, the electronic control unit 30 executes step S420 for setting the target valve duration θt and the target valve duration center φt in priority to the setting of the target valve duration θt and the target valve duration center φt in FIGS. 3 to 5 (step S120, s220, S230, S320, S330). That is, when there is a request for stopping the engine 10, the valve duration θ and the valve duration center φ are returned to the initial values preferentially.

Figure 8:
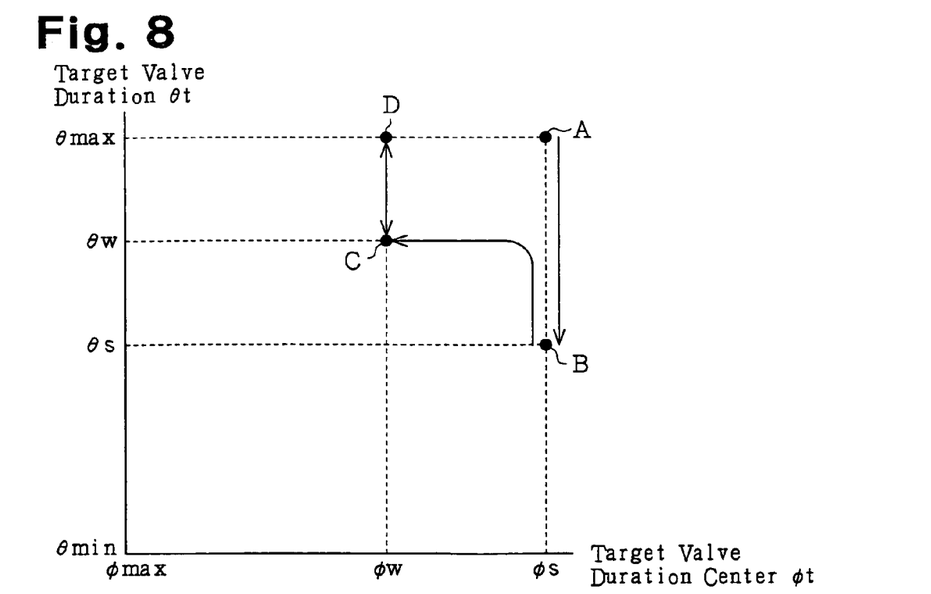
FIG. 8 is a diagram showing an example of control for valve duration and the center of the valve duration.

An example of the procedure for setting the target valve duration θt and the target valve duration center φt will now be described with reference to FIG. 8.

First, prior to starting of the engine 10, that is, when the engine 10 is not operating, the target valve duration θt and the target valve duration center φt are set to the initial values, or the maximum valve duration θmax and the engine starting valve duration center φs (state A). When a request for starting the engine 10 is made, only the target valve duration θt is changed and set to the engine starting valve duration θs (state B). Thereafter, when the starting of the engine 10 is completed and the warm-up is started, the target valve duration θt is changed to the warm-up valve duration θw during the engine operation in the low-to-middle speed range, for example, during fast idling. Accordingly, the amount of generated heat raises the engine coolant temperature. When the engine coolant temperature reaches and surpasses the predetermined value, the target valve duration center φt is changed to the warm-up valve duration center φw (state C).

When the engine 10 operates in the high speed range, only the target valve duration θt is changed. That is, the target valve duration θt is increased from the warm-up valve duration θw in accordance with increase in the engine speed Ne. For example, if the engine speed Ne fluctuates in the high speed range, the target valve duration θt fluctuates in a range between the warm-up valve duration θw and the maximum valve duration θmax (between state C and state D).

Figure 9:
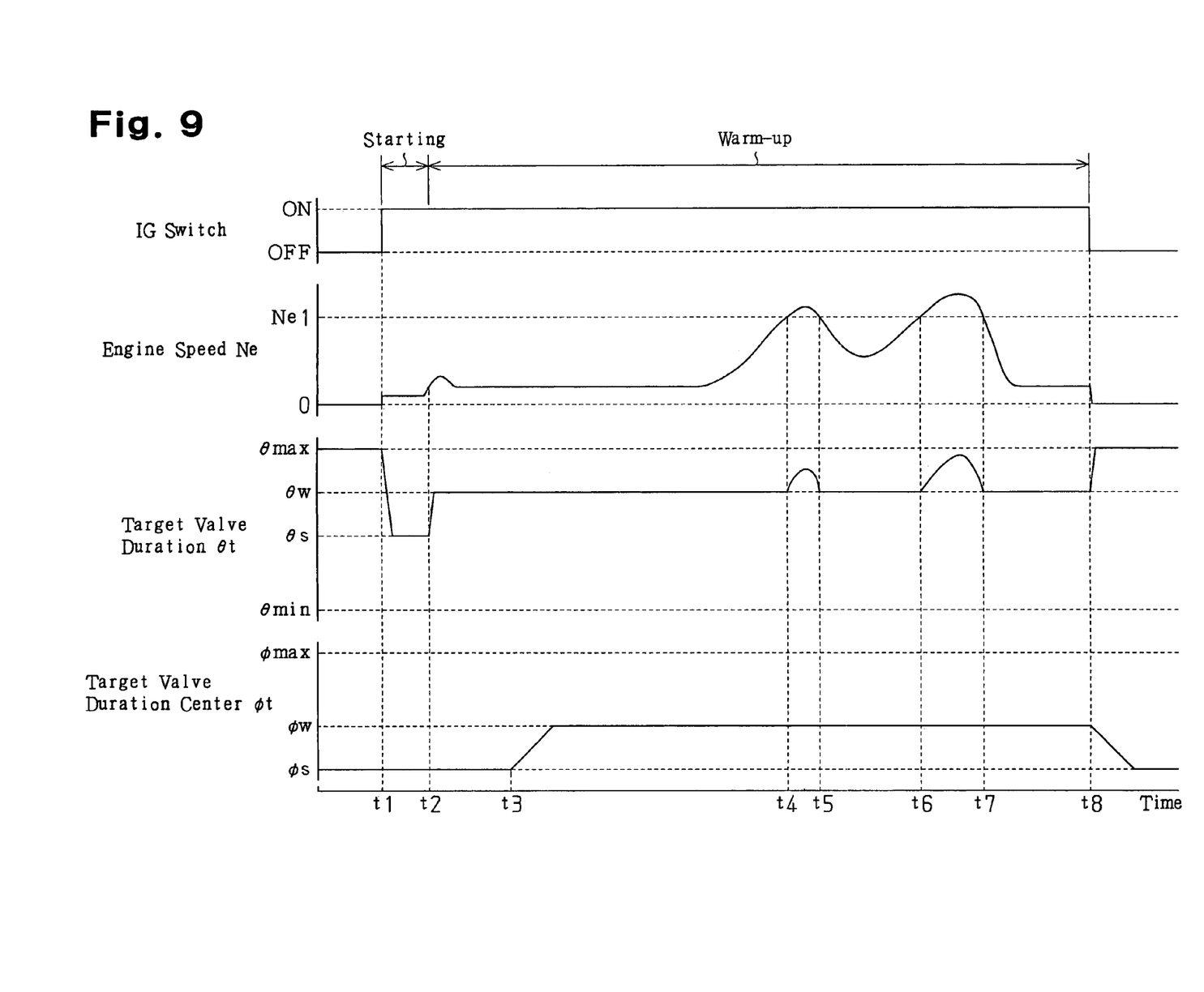
FIG. 9 is a timing chart showing an example of control for the valve duration and the center of the valve duration.

FIG. 9 is a timing chart showing such an example. That is, when starting of the engine 10 is initiated as the IG switched on, the target valve duration θt, which is the maximum valve duration θmax before the starting is initiated, is changed toward the engine starting valve duration θs (time t1). At this time, to prevent the valve duration θ from being abruptly changed, the target valve duration θt is gradually changed (gradually decreased).

When the starting of the engine 10 is completed, the target valve duration θt is changed toward the warm-up valve duration θw (time t2). At this time, to prevent the valve duration θ from being abruptly changed, the target valve duration θt is gradually changed (gradually increased). In this manner, the target valve duration θt is fixed to the warm-up valve duration θw. This permits the generation of the heat amount during the warm-up and the improvement of the emission performance to be achieved at the same time.

When the engine coolant temperature increases to be equal to or higher than the predetermined value, the target valve duration center φt is changed to the warm-up valve duration center φw (time t3). At this time, to prevent the valve duration center φ from being abruptly changed, the target valve duration center φt is gradually changed (gradually increased). The rate of the gradual increase may be slow in consideration of the controllability of the variable valve timing mechanism 21.

In this manner, while the engine 10 is operating in the low-to-middle speed range, the target valve duration θt and the target valve duration center φt are fixed to the warm-up valve duration θw and the warm-up valve duration center φw, respectively. When the engine speed Ne surpasses the threshold speed Ne1 and enters the high speed range, the target valve duration θt is increased in accordance with the increase in the engine speed (a period from time t4 to time t5, and a period from time t6 to time t7). Accordingly, the engine power is favorably generated in the high speed range.

When the IG switch is turned off, the target valve duration θt and the target valve duration center φt are both returned to the initial values (time t8). At this time, to prevent the valve duration θ and the valve duration center φ from being abruptly changed, the target valve duration θt and the target valve duration center φt are gradually changed (gradually decreased).

The preferred embodiment has the following advantages.

(1) In this embodiment, during the warm-up, that is, in a period from when the engine starting is initiated to when the warm-up is completed, the valve duration θ is fixed to the warm-up valve duration θw while the engine 10 is operating in the low-to-middle speed range. Thus, the warm-up is efficiently accelerated to the utmost while improving the emission performance.

Also, in this embodiment, when there is a request for operating the engine 10 in the high speed range, the valve duration θ is increased from the warm-up valve duration θw in accordance with the increase in the engine speed Ne. The operation in the high speed range is readily performed.

Therefore, according to this embodiment, the warm-up is efficiently accelerated while flexibly responding to such a request for a high power operation.

(2) In this embodiment, during the warm-up, the variable valve timing mechanism 21 fixes the valve duration center φ of the intake valve 16 to the previously set warm-up valve duration center φw. That is, the valve timing of the intake valve 16 is fixed to the previously set warm-up valve timing.

Therefore, in the case of a low controllability, for example, when the oil for actuating the variable valve timing mechanism 21 has a low temperature and a high viscosity, the emission performance is maintained to a favorable state to the utmost. Also, in this embodiment, the valve duration θ of the intake valve 16 is fixed to the warm-up valve duration θw and does not fluctuate while the engine 10 is operating in the low-to-middle speed range. Therefore, the warm-up valve duration center φw, or the warm-up valve timing, is easily set to a value for maintaining the emission performance.

The present invention is not restricted to the illustrated embodiment but may be embodied in the following modifications.

In the illustrated embodiment, the valve duration θ and the valve duration center φ are fixed to the warm-up valve duration θw and the warm-up valve duration center φw. In addition to these control, the ignition timing of the ignition plug 18 may be retarded so that the engine power is decreased and the amount of generated heat is increased, accordingly. In this case, the warm-up is further accelerated.

The variable valve timing mechanism 21 may be actuated regardless of the oil temperature. That is, in the illustrated embodiment, the valve duration center φ is changed from the engine starting valve duration center φs to the warm-up valve duration center φw on the condition that the oil temperature is equal to or greater than the predetermined value. However, such a condition does not need to be employed, and, for example, when changing the valve duration θ from the engine starting valve duration θs to the warm-up valve duration θw, the valve duration center φ may be changed in the above described manner.

The warm-up process for the valve timing (process related to the control routine of FIG. 5) may be omitted. Further, for example, in an engine that has no variable valve timing mechanism 21, only the control related to the valve duration θ may be performed.

In the illustrated embodiment, the valve duration θ is fixed to the previously set warm-up valve duration θw when the engine 10 is operating in the low-to-middle speed range during the warm-up. When the engine 10 is operating in the high speed range, the valve duration θ is increased from the warm-up valve duration θw in accordance with-increase in the engine speed Ne. This configuration may be modified as follows. For example, it may be configured that, in the low-to-middle speed range of the engine 10 during the warm-up, the valve duration θ is fixed to the warm-up valve duration θw, and, in the high speed range of the engine 10, the valve duration θ is increased from the warm-up valve duration θw in accordance with increase in the engine load. The engine load is obtained by referring to, for example, a detection value of the accelerator pedal depression degree detected through the accelerator pedal position sensor 31, or a detection value of the intake air amount detected through the air flow meter 14.

In this configuration, since the valve duration θ is fixed to the warm-up valve duration θw while the engine 10 is operating in the low-to-middle speed range, the warm-up is efficiently accelerated while improving the emission performance to the utmost. Also, when there is a request for operating the engine 10 in the high speed range, the valve duration θ is increased from the warm-up valve duration θw in accordance with the increase in the engine load. The request is therefore readily satisfied. Therefore, the warm-up is efficiently accelerated to the utmost while flexibly responding to such a request for high speed range operation.

For example, it may be configured that, during the warm-up, the valve duration θ is fixed to the warm-up valve duration θw on the condition that the requested intake air amount is equal to or less than a predetermined intake air amount, and that the valve duration θ is increased from the warm-up valve duration θw in accordance with increase in the requested intake air amount on the condition that the requested intake air amount is greater than the predetermined intake air amount. The requested intake air amount is obtained by referring to, for example, a detection value of the accelerator pedal depression degree detected through the accelerator pedal position sensor 31.

In this configuration, since the valve duration θ is fixed to the warm-up valve duration θw when the requested intake air amount is equal to or less than the predetermined intake air amount, the warm-up is efficiently accelerated to the utmost while improving the emission performance. Also, when there is a request for an intake air amount greater than the predetermined intake air amount, the valve duration θ is increased from the warm-up valve duration θw in accordance with the increase in the requested intake air amount. The request is therefore readily satisfied. Therefore, the warm-up is efficiently accelerated to the utmost while flexibly responding to such a request for high speed range operation.

In this configuration, where the quantity of the intake air amount is used as a condition, the predetermined intake air amount is preferably set to an intake air amount that is obtained by maximizing the opening degree of the throttle valve 15 with the valve duration θ set to the warm-up valve duration θw. Such an intake air amount will hereafter be referred to as a reference intake air amount GaC.

In this case, if the requested intake air amount is equal to or less than the predetermined intake air amount, the valve duration θ is not changed from the warm-up valve duration θw. The upper limit of the range of the requested intake air amount in which acceleration of the warm-up and improvement of the emission performance are both achieved is equal to the reference intake air amount GaC.

If the predetermined intake air amount is set to a value less than the reference intake air amount GaC, the upper limit of the range of the requested intake air amount in which acceleration of the warm-up and improvement of the emission performance are both achieved is lowered compared to the case where such setting is not applied. In this case, if the requested intake air amount is increased to the reference intake air amount GaC, the valve duration $\theta$ is changed from the warm-up valve duration $\theta w$. The balance between the acceleration of the warm-up and the improvement of the emission performance can be displaced from the optimal point. Such concerns are put to rest by setting the predetermined intake air amount to the reference intake air amount GaC.

On the other hand, in the case where the predetermined intake air amount is set greater than the reference intake air amount GaC, if an intake air amount that is less than the predetermined intake air amount and greater than the reference intake air amount GaC is requested, the intake air amount cannot be adjusted according to the request. Such values of the requested intake air amount that cannot be adjusted are eliminated by setting the predetermined intake air amount to the reference intake air amount GaC.

Therefore, in a state where values of the intake air amount that cannot be adjusted are eliminated by setting the predetermined intake air amount to the reference intake air amount GaC, the upper limit of the range of the requested intake air amount in which acceleration of the warm-up and improvement of the emission performance are both achieved is maximized.

The present examples and embodiments are to be considered as illustrative and not restrictive, and the invention is not to be limited to the details given herein, but may be modified within the scope and equivalence of the appended claims.

The invention claimed is:

1. A control apparatus for an internal combustion engine, the engine having a variable valve duration mechanism that changes a valve duration of an intake valve and a throttle valve for changing a flow rate of air supplied to the engine, wherein the engine performs cooperative control for the valve duration of the intake valve and an opening degree of the throttle valve, thereby adjusting the intake air amount,
  wherein, during a period from immediately after starting of the engine to when warm-up is completed, the valve duration is fixed to a predetermined warm-up valve duration in a low-to-middle speed range of the engine, and the valve duration is increased from the warm-up valve duration in accordance with increase in the engine speed in a high speed range of the engine.

2. The control apparatus according to claim 1,
  wherein the engine includes a hydraulic variable valve timing mechanism that changes valve timing of the intake valve, and wherein, during a period from immediately after starting of the engine to when warm-up is completed, the valve timing of the intake valve is fixed to a predetermined warm-up valve timing.

3. A control apparatus for an internal combustion engine, the engine having a variable valve duration mechanism that changes a valve duration of an intake valve and a throttle valve for changing a flow rate of air supplied to the engine, wherein the engine performs cooperative control for the valve duration of the intake valve and an opening degree of the throttle valve, thereby adjusting the intake air amount,
  wherein, during a period from immediately after starting of the engine to when warm-up is completed, the valve duration is fixed to a predetermined warm-up valve duration in a low-to-middle load range of the engine, and the valve duration is increased from the warm-up valve duration in accordance with increase in the engine load in a high load range of the engine.

4. The control apparatus according to claim 3,
  wherein the engine includes a hydraulic variable valve timing mechanism that changes valve timing of the intake valve, and wherein, during a period from immediately after starting of the engine to when warm-up is completed, the valve timing of the intake valve is fixed to a predetermined warm-up valve timing.

5. A control apparatus for an internal combustion engine, the engine having a variable valve duration mechanism that changes a valve duration of an intake valve and a throttle valve for changing a flow rate of air supplied to the engine, wherein the engine performs cooperative control for the valve duration of the intake valve and an opening degree of the throttle valve, thereby adjusting the intake air amount,
  wherein, during a period from immediately after starting of the engine to when warm-up is completed, the valve duration is fixed to a predetermined warm-up valve duration on the condition that a requested intake air amount is equal to or less than a predetermined air amount, and the valve duration is increased from the warm-up valve duration in accordance with increase in the intake air amount on the condition that the requested intake air amount is greater than the predetermined air amount.

6. The control apparatus according to claim 5,
  wherein the predetermined air amount is an air amount that is obtained when the throttle valve is maximally opened with the valve duration set to the warm-up valve duration.

7. The control apparatus according to claim 6,
  wherein the engine includes a hydraulic variable valve timing mechanism that changes valve timing of the intake valve, and wherein, during a period from immediately after starting of the engine to when warm-up is completed, the valve timing of the intake valve is fixed to a predetermined warm-up valve timing.

* * * * *